US010673312B2

(12) United States Patent
Bouvier et al.

(10) Patent No.: US 10,673,312 B2
(45) Date of Patent: Jun. 2, 2020

(54) ELECTRIC MACHINE, STATOR FOR AN ELECTRIC MACHINE AND VEHICLE

(71) Applicant: Magna Powertrain GmbH & Co KG, Lannach (AT)

(72) Inventors: Stephan Bouvier, Graz (AT); Peter Pisek, Leibnitz (AT); Andreas Schmidhofer, Bruck an der Mur (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 294 days.

(21) Appl. No.: 15/535,532

(22) PCT Filed: Dec. 15, 2015

(86) PCT No.: PCT/EP2015/079753
§ 371 (c)(1),
(2) Date: Jun. 13, 2017

(87) PCT Pub. No.: WO2016/096830
PCT Pub. Date: Jun. 23, 2016

(65) Prior Publication Data
US 2017/0346374 A1    Nov. 30, 2017

(30) Foreign Application Priority Data

Dec. 16, 2014   (DE) .......................... 10 2014 226 129

(51) Int. Cl.
*H02K 21/44*     (2006.01)
*H02K 1/17*      (2006.01)
*H02K 1/20*      (2006.01)

(52) U.S. Cl.
CPC .............. *H02K 21/44* (2013.01); *H02K 1/17* (2013.01); *H02K 1/20* (2013.01)

(58) Field of Classification Search
CPC ............. H02K 21/44; H02K 1/20; H02K 1/17
(Continued)

(56) References Cited

U.S. PATENT DOCUMENTS 8,242,645 B2 *   8/2012   Tatematsu ............ H02K 1/2766
                                                          310/52
8,368,265 B2 *   2/2013   Owng ...................... H02K 9/20
                                                          310/52

(Continued)

FOREIGN PATENT DOCUMENTS

CN      203416069 U    1/2014
CN      103701287 A    4/2014

(Continued)

OTHER PUBLICATIONS

International Search Report and Written Opinion dated Mar. 4, 2016 from International Patent Application No. PCT/EP2015/079753 (with English translation of International Search Report).

(Continued)

*Primary Examiner* — Forrest M Phillips
(74) *Attorney, Agent, or Firm* — Dickinson Wright PLLC (57) ABSTRACT

A stator for an electric machine comprising a rotor and stator poles. At least one partial amount of stator poles each comprises a pole winding and a permanent magnet unit. A first magnetic flux induced by the permanent magnet unit is superimposed by a second magnetic flux is an electric voltage is applied to the pole winding or an electrical current is injected into the pole winding. A recess is arranged in the permanent magnet unit, which recess faces the rotor. An electric machine comprising a stator according to the invention, wherein the rotor is designed to change a magnetic resistance of a magnetic circuit, which extends through a permanent magnet unit of stator poles of the stator, according to the position of the rotor.

17 Claims, 3 Drawing Sheets

(58) Field of Classification Search
USPC .......................................................... 310/52
See application file for complete search history.

(56) References Cited

U.S. PATENT DOCUMENTS

| | | | |
|---|---|---|---|
| 2006/0131967 A1 | 6/2006 | Lin et al. | |
| 2009/0091198 A1 | 4/2009 | Husband et al. | |
| 2010/0176677 A1* | 7/2010 | Labbe | H02K 23/42 310/154.29 |
| 2013/0069453 A1* | 3/2013 | Jung | H02K 21/44 310/46 |
| 2014/0239763 A1 | 8/2014 | Raminosoa et al. | |
| 2016/0043613 A1* | 2/2016 | Patel | H02K 9/19 310/54 |
| 2016/0204663 A1* | 7/2016 | Huang | H02K 19/38 310/59 |

FOREIGN PATENT DOCUMENTS

| | | |
|---|---|---|
| CN | 103973062 A | 8/2014 |
| EP | 2209193 A1 | 7/2010 |
| JP | 2013027240 A | 2/2013 |
| WO | WO2013157165 A1 | 10/2013 |

OTHER PUBLICATIONS

Y. Amara, et al., "Hybrid Excitation Synchronous Machines: Energy-Efficient Solution for Vehicles Propulsion", IEEE Transactions on Vehicular Technology, vol. 58, No. 5; Jun. 2009, pp. 2137-2149.
J. Shen, et al., "Permanent Magnet Flux Switching Machines—Toplogies, Analysis and Optimization", Power Engineering, Energy and Electrical Drives, 2013 Fourth International Conference, Istanbul, Turkey, May 13-17, 2013, pp. 352-366.
Search Report dated Nov. 2, 2018 from corresponding Chinese Patent Application No. 201580068859.9.

* cited by examiner

ELECTRIC MACHINE, STATOR FOR AN ELECTRIC MACHINE AND VEHICLE

CROSS-REFERENCE TO RELATED APPLICATIONS

This application is a National Stage of International Application No. PCT/EP2015/079753 filed on Dec. 15, 2015 and which claims the benefit and priority of German Application No. DE102014226129.5 filed on Dec. 16, 2014. The entire disclosure of each of the above applications is incorporated herein by reference.

FIELD

The invention relates to a stator for an electric machine comprising a rotor, wherein the stator comprises stator poles. At least one partial amount of stator poles each comprises a pole winding (stator pole winding) and a permanent magnet unit. A first magnetic flux induced by the permanent magnet unit is superimposed by a second magnetic flux if an electric voltage is applied to the pole winding or an electric current is injected into the pole winding. The electric machine can be a motor and/or a generator. Regardless of this distinction, the electric machine can be a rotating machine or a linear machine (i.e., for example, a linear motor and/or a linear generator). The permanent magnet unit is a component of the stator pole which (in a transverse plane of the stator) comprises at least one or at least two permanent magnets. Even if related variants, in the interests of clarity, are not explicitly described hereinafter, the present invention also relates to stators of electric machines in which the stator claimed in the patent claims (for example, with respect to the bodywork of a vehicle) is moveable (rather than stationary), for example in a rotating arrangement, whereas the armature is stationary (rather than moveable). Moreover, in the case of a rotating machine, the armature can also be described as a rotor. Hereinafter, linear machines are not considered separately, but are included in the consideration of rotating machines wherein, in this case, it is inferred that the armature is of virtually infinite diameter.

The invention additionally relates to an electric machine comprising a stator and a rotor, which is designed to change a magnetic resistance of a magnetic circuit, which extends through a permanent magnet unit of a stator pole of the stator, according to the position of the rotor.

The invention further relates to a vehicle having a stator according to the introductory clause of claim 1 or having an electric machine according to the introductory clause of claim 9. The vehicle can be, for example, an electric vehicle, a hybrid vehicle, a marine vehicle, an aircraft and/or a terrestrial vehicle (specifically a passenger vehicle, a heavy goods vehicle, a rail vehicle, a construction vehicle or an agricultural vehicle). Independently, the stator according to the invention can also be part of a machine which is not a vehicle, but which, for example, is part of a domestic appliance, a heating or air-conditioning installation, a production machine, an electrically-powered tool or a machine tool.

BACKGROUND

In vehicular applications, for example belt-driven starter motors/generators, an electric machine with the maximum possible power density is required, which can be produced as cost-effectively as possible. For operation at high speeds (for example, in excess of 20 000 r.p.m.) and a high belt transmission ratio, a flux switching machine (FSwM), for example, with permanent magnets can be appropriate. Above a given transition speed (as in the case of a permanent magnet-excited synchronous machine), the permanent magnet field in a flux switching machine must also be attenuated, if the speed is to be further increased. This has been confirmed by Shen, J.-X., Fei, W.-Z., "Permanent Magnet Flux Switching Machines—Topologies, Analysis and Optimization", Fourth International Conference on Power Engineering, Energy and Electrical Drives (POWERENG), Istanbul, 13-17 May 2013, wherein reference is made to the requirement for a controllable main field flux in a permanent magnet flux switching machine. However, in known flux switching machines, a sufficient attenuation of the flux generated by the permanent magnets, by the injection of a current into the pole windings, is more difficult to achieve.

In the case of operation in the field shunting range (i.e. operation with reduced torque in excess of a transition speed), the flux switching machine is operated with reduced current strength and a corresponding phase angle. At least in subregions of the stator, the magnetic flux which is generated by the permanent magnets will then predominate over the magnetic flux which is generated by the energization of the pole windings. In consequence, the resulting overall magnetic flux, even at the peak value of the alternating electric current, will not necessarily generate magnetic field lines which are oriented through this pole winding only. Magnetic fluxes are, inter alia, also generated in magnetic leakage paths (e.g. between rotor teeth, via the air gap). This is because in a flux switching machine of conventional design, the magnetic resistance of a magnetic circuit which is routed through the respective permanent magnets but not through the associated pole winding (magnetic short-circuit), at least in subregions of the permanent magnet and at specific rotor positions, is lower than that of other magnetic circuits, which are not only routed through the respective permanent magnet, but also through the associated pole winding. This is described as a stray flux.

Depending upon the rotor position, it is therefore possible that the magnetic field in these subregions of the permanent magnets is not interlinked with the pole winding, but bypasses the associated pole winding (and is thus routed via a magnetic short-circuit, with respect to the pole winding). Consequently, in many cases, the magnetic flux which is generated by the respective permanent magnet cannot be compensated, to the desired extent, by the magnetic flux which is generated by the pole winding. In other words: the magnetic field which is generated by the respective permanent magnet cannot be sufficiently compensated, without further measures, by the magnetic field which is generated by the pole winding. Independently of the short-circuits associated with the rotor position, minor stator-internal magnetic short-circuits can occur which (notwithstanding their detrimental magnetic effect) are accepted under certain circumstances, for example in the interests of improving or simplifying a stator design by means of internal and/or external bars.

SUMMARY

One object of the invention is the disclosure of a flux switching machine, the main flux of which can be attenuated to a sufficient extent by the injection of a current into the pole winding, such that the field shunting range of the flux switching machine is extended, and the latter can thus also be operated at a higher speed (for example, in excess of 20 000 r.p.m.).

This object is fulfilled by a stator having the characteristics of patent claim 1. The object is moreover fulfilled by an electric machine according to claim 9 and a vehicle according to claim 10. Advantageous further developments of the concept of the invention are described in the sub-claims.

The stator according to the invention for an electric machine comprising a rotor comprises stator poles. At least one partial amount of stator poles each comprises a pole winding (stator pole winding) and a permanent magnet unit. A first magnetic flux induced by the permanent magnet unit is superimposed by a second magnetic flux if an electric voltage is applied to the pole winding or if an electric current is injected into the pole winding. A recess is arranged in the permanent magnet unit, which recess faces the rotor. The recess can also be a cut-out, or can be designated as such.

By means of the recess, it is at least partially prevented that, if a tooth of the rotor (rotor tooth) is located in the region of a permanent magnet unit, said tooth can complete a magnetic circuit, the field line of which emerges from the permanent magnet unit on a lateral surface of the permanent magnet unit which faces the rotor. A detailed description of this subject matter is included in the description of the figures. The recess can provide a further advantage, in that it can contribute to the targeted control and reduction of unbalanced magnetic forces (UMF) which typically occur in flux switching machines having specific ratios of rotor and stator teeth.

The electric machine according to the invention comprises a stator and a rotor. The rotor is designed, at least within a first rotor position range, to complete a first magnetic circuit, wherein a permanent magnet unit of the stator pole magnetizes a pole winding of the stator pole in a first direction. The rotor is moreover designed, at least within a second rotor position range, to complete a second magnetic circuit, wherein the permanent magnet unit magnetizes the pole winding of the stator pole in a second direction, which is in opposition to the first direction. The stator is a stator according to the invention.

Correspondingly, the vehicle according to the invention comprises a stator according to the invention or an electric machine according to the invention.

Particularly advantageously, the permanent magnet unit, in a transverse plane of the stator, comprises a first and a second permanent magnet, which is arranged in series with the first permanent magnet, with the same magnetic pole orientation, wherein the two permanent magnets in the series-connected arrangement are magnetically interconnected by means of a soft magnetic intermediate segment, wherein the recess is arranged in the soft magnetic intermediate segment. By the employment of a permanent magnet unit, in which a soft magnetic intermediate segment is arranged between two permanent magnets, the entire permanent magnet unit does not need to be entirely comprised of a hard magnetic material, which is generally more expensive than a soft magnetic material. Expensive hard magnetic material can be economized accordingly. Currently available materials for permanent magnets can, on the one hand, be substantially more expensive than a previously-employed hard magnetic material but, on the other hand, have an advantage, in that their coercive field strength is sufficiently great for the operation of the flux switching machine, where the permanent magnet unit is only partially comprised of a permanent magnet material. The remaining (and generally larger) proportion of the permanent magnet unit can be comprised of a more cost-effective soft magnetic material. This applies to all forms of embodiment of the invention.

According to one of many potential variants of embodiment of the present invention, the recess in the permanent magnet unit extends over full a lateral surface of the soft magnetic intermediate segment, facing the rotor. By the enlargement of the air gap thickness over the entire lateral surface of the soft magnetic intermediate segment, it can partially be prevented that an individual rotor tooth (if the circumferential segment length thereof (i.e. the width of the tooth at the air gap) is broader than a thickness of an individual permanent magnet in the tangential direction) can directly short-circuit the magnetic field of an (i.e. of this) individual permanent magnet via the soft magnetic intermediate segment. The term "direct" here signifies the following: with no diversion via another rotor tooth.

According to a preferred form of embodiment, the recess is configured in a transverse plane of the stator. A recess with a rectangular or trapezoidal cross-section can potentially be produced more cost-effectively than a recess having a different cross-section.

According to a likewise preferred form of embodiment, an opening in the recess tapers and/or expands in the direction of the rotor. By this arrangement, the shape of the recess can be optimized, firstly in order to achieve a desired speed and/or field attenuation behavior, and secondly in order to generate the minimum possible unbalanced magnetic forces. Optimization of the shape of the recess can be achieved with the aid of simulations involving various recesses, or with the aid of tests involving various recesses, conducted on a test bench.

Independently hereof, the recess can be a slot, the principal longitudinal axis of which is oriented transversely to a transverse plane of the stator. As a result, the advantages of the invention can be exploited over at least a substantial proportion of the length of the stator, or even over an entire axial length of the stator. According to an appropriate further development, the principal longitudinal axis of the slot is arranged in the same plane as a principal longitudinal axis of the stator. This is conducive to a stator of simple geometrical design. According to a further specialization, the principal longitudinal axis of the slot is oriented in parallel with the principal longitudinal axis of the stator. This is conducive to a stator design of even greater geometrical simplicity. By this arrangement, the air gap of the flux switching machine essentially assumes a cylindrical tubular form. Regardless of whether the air gap of the flux switching machine is essentially of a bevelled tubular shape only, or even of a cylindrical tubular shape, the slots along the inner circumference of the stator can also be oriented obliquely (i.e. helically). The principal longitudinal axis of a non-oblique slot is oriented in the same plane as an area vector of a transverse plane of the stator. In the case of an oblique (i.e. helically-oriented) slot, there is no plane in which both a principal longitudinal axis of the slot and the area vector of a transverse plane of the stator are oriented.

In each form of embodiment described thus far, it can be particularly advantageous if the recess is designed for the conveyance of a coolant. Accordingly, a separate arrangement for the conveyance of a coolant can be omitted. Alternatively or additionally, the recess can be designed for the accommodation of a tube, which is provided for the conveyance of a coolant. Accordingly, the distribution of the coolant in other regions of the air gap can be avoided. Alternatively or additionally, the recess can contain a filler material which is not ferromagnetic (neither a hard nor a soft magnetic material). The filler material can have, for example, a plastic material and/or a non-ferromagnetic material (for example aluminum or a non-magnetic special steel). By means of this filling, the generation of noise associated with a reciprocal hydrodynamic action between rotor teeth and the recesses can be reduced, or entirely prevented.

Appropriately, at least one of the stator poles comprises two pole segments which are mechanically connected by means of at least a first bar, which is arranged between the rotor and a permanent magnet unit. By this arrangement, the pole segments in the region of the air gap can be secured with great dimensional accuracy. Alternatively or additionally, it can also be appropriate if the same and/or at least one of the other stator poles comprises two pole segments which are mechanically connected by means of at least a second bar, which is arranged on a side of the stator which is averted from the rotor. Accordingly, a mutual attachment of the pole segments can be arranged in an outer region of the flux switching machine. As a result of its arrangement in the outer region of the flux switching machine, the arrangement of the second bar can have an advantage, in that the bar in this arrangement influences the magnetic performance of the flux switching machine to a lesser extent than a bar which is arranged in proximity to the air gap. The first and/or second bar can be formed of a non-magnetic material (for example, of aluminum or a steel), or doped with the latter, such that it influences the magnetic performance of the flux switching machine to the least possible extent. The first or second bar can be a bracket or a ring.

It can also be appropriate if the mutually-facing pole segments are mechanically connected by at least two mutually-adjoining stator poles. A number of individual components of the stator can thus be minimized.

Each of the aforementioned forms of embodiment is combinable with the characteristic, wherein the air gap of the flux switching machine is essentially of a bevelled tubular shape, and specifically of a cylindrical tubular shape.

Independently hereof, each of the aforementioned forms of embodiment can be combined with the advantageous characteristic, wherein the stator comprises a butt-mounted arrangement of stator poles, wherein the stator poles each comprise a first and a second pole segment, each incorporating a soft magnetic material, wherein a permanent magnet unit is arranged respectively between the first and second pole segments. A proven basic structure is employed for the flux switching machine accordingly.

Moreover, each of the aforementioned forms of embodiment is combinable with the advantageous characteristic, wherein the first pole segment of a stator pole directly adjoins a second pole segment of another stator pole, which is directly adjacent to the first stator pole and, simultaneously, the second pole segment of the first-mentioned stator pole directly adjoins a first pole segment of a further stator pole, which is also directly adjacent to the aforementioned stator pole. A proven basic structure is employed for the flux switching machine accordingly.

DRAWINGS

The invention is described in greater detail hereinafter with reference to the exemplary embodiments represented in the schematic drawings. Herein.

In the figures, the same reference symbols are employed in each case for equivalent components. Reference symbol-related descriptions therefore apply across the figures, unless otherwise dictated by the relevant context.

DETAILED DESCRIPTION

Figure 1:
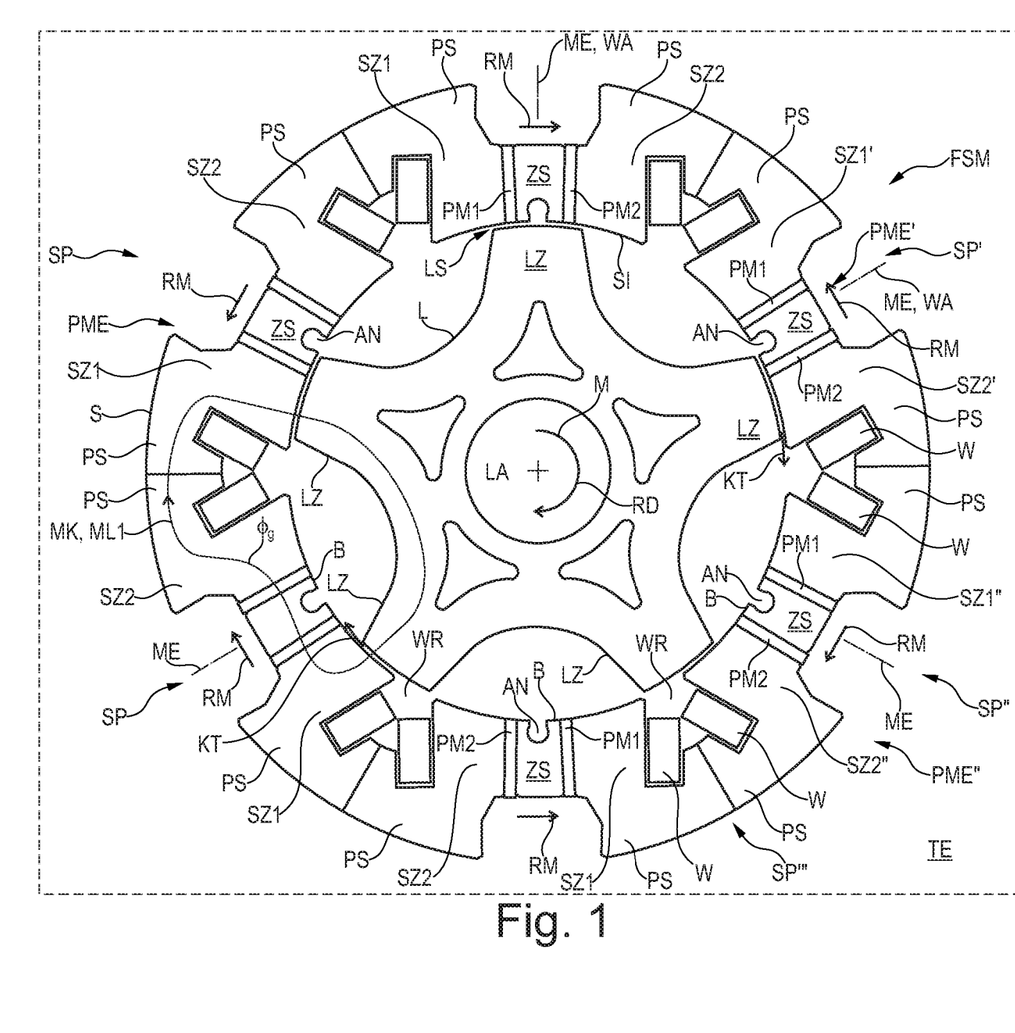
FIG. 1 shows a schematic section of a transverse plane of a flux switching machine.

The following description of a flux switching machine with reference to FIG. 1 applies in general for each, or virtually each type of flux, switching machine FSM. The reference to FIG. 1, and the exemplary numbers contained therein, is intended to clarify the subject matter described, but does not imply any limitation to the form of embodiment of a flux switching machine FSM of the design represented in FIG. 1.

The electric machine represented in FIG. 1 is a flux switching machine FSM with a stator S and a rotor L, which is arranged to rotate around a rotor axis LA. The stator S has six stator poles SP, each with a first stator tooth SZ1 and a second stator tooth SZ2, wherein directly-adjoining stator poles SP in the stator S are mutually offset by a circumferential angle of 60°. In stationary motor operation in a rotational direction RD (of the rotor L in relation to the stator S), the flux switching machine FSM is generally operated such that, at all times, or at least for a substantial proportion of the time, at least one tooth LZ of the rotor L (rotor tooth LZ), in the region of a tooth SZ1, SZ2 of the stator S (stator tooth SZ), is attracted by a tangential force component KT (a magnetic force) towards the stator tooth SZ1, SZ2. Conversely to many conventional electric machine types, the force KT which drives a flux switching machine FSM is not a Lorentz force, but a reluctance force. The force KT which drives a flux switching machine FSM is a force KT which substantially proceeds from the circumstance whereby the rotor L endeavors to assume a position which is more favorable, with respect to energy, than its current position. The lower the magnetic resistance (reluctance) of an active magnetic circuit MK, the more favorable the rotor position will be, with respect to energy. The basic principle for the generation of the force KT on the individual rotor teeth LZ is thus identical to the basic principle of the generation of force by an electromagnet. In a flux switching machine FSM with a rotating rotor L, the tangential component KT of the force on individual rotor teeth LZ generates a torque M around an axis LA of the rotor L. In this case, a magnetic circuit MK is described as active if the total magnetic potential Θg (total magnetomotive force Θg), representing the sum of all the magnetic potential sources PME present in the magnetic circuit MK, is not equal to zero.

In the flux switching machine FSM represented in FIG. 1, the magnetic circuit MK is also routed through the pole winding W of an adjoining stator pole SP. Consequently, the actual current flowing in the pole winding W of the adjoining stator pole SP also contributes to the actual total magnetic potential Θg of the magnetic circuit MK. In the following description, however, this circumstance is overlooked, in the interests of clarity.

In order to prevent the locking of the rotor L in a favorable position, with respect to energy, immediately it has achieved this position, but to ensure the continuing rotation thereof, in a flux switching machine FSM, the static magnetic flux φp generated by the permanent magnet units PME is superimposed by a magnetic flux φw (rotary field), which is generated by a three-phase or multi-phase alternating current flowing in the pole windings W. By the rotation of the rotary magnetic field φw around the rotor axis LA, it is achieved that the force KT acting on a rotor tooth LZ, which is already in a favorable position with respect to energy (i.e. in a position of low magnetic resistance), is periodically reduced or is even completely compensated. Accordingly, a restoring force acting in a tangential direction on a rotor tooth LZ, which is already in a favorable position with respect to energy, is reduced. At the same time, a total magnetic flux φg is increased in (at least) one other rotor tooth LZ, which already lies within the magnetic field of another stator tooth SZ, but is not yet in the optimum position with respect to energy, such that the rotor L is driven by the magnetic force KT acting on the other rotor tooth LZ in a tangential direction.

In the stationary operation of the flux switching machine FSM (motor operation), three-phase AC is conducted by the pole windings W. In the pole winding W of the individual stator pole SP, only a single phase of the three-phase AC flows. The magnetic flux φw which is thus generated in the stator pole SP alternates its direction exactly two times in the course of an electrical cycle and, upon each changeover, passes through a zero-crossing. Accordingly, in the pole winding W of each individual stator pole SP, an alternating current flows which, in each case, generates a magnetic flux φw which is superimposed on the magnetic flux φp of the permanent magnet unit PME. The current energization of the pole winding W of the stator S, and the current position of that rotor tooth LZ which is closest to the respective stator pole SP considered, will dictate whether the magnetic flux φp of the permanent magnet unit PME is amplified or attenuated by superimposition with the magnetic flux φw of the pole winding W. Amplification and attenuation of the magnetic flux does not proceed synchronously on all the stator poles SP, but is temporally offset, according to the mechanical circumferential position of the respective stator pole SP and the phase angle of energization of the respective stator pole SP.

In the interests of clarification, it is inferred that, for the magnetic flux φg=φp+φw in the rotor tooth LZ, the principle of superimposition applies by way of approximation. In this case, the effects of the magnetic flux φw which is generated by the pole winding W, and the effects of the magnetic flux φp generated by the permanent magnet unit PME, can be determined separately, and an overall effect obtained by linear superimposition. The magnetic flux component φp of the overall magnetic flux φg (magnetic flux field) generated by the permanent magnet units PME is temporally and spatially static. The magnetic flux component φw of the overall magnetic flux φg (magnetic flux field) generated by means of three-phase AC in the pole windings W constitutes a rotary magnetic field φw in the flux switching machine FSM.

In the flux switching machine FSM represented in FIG. 1, at a maximum positive current value (in the pole winding W), the flux component φp1 of the permanent magnet unit PME is superimposed, in an amplifying manner, by the flux φw of the pole winding W and flows through the first stator tooth SZ1 of the stator pole SP. At the same time, the flux φw of the pole winding W at least partially compensates the flux component φp2 of the permanent magnet unit PME, which flows through the second stator tooth SZ2 of the stator pole SP. In the inverse current direction, at a maximum current value (flowing in the pole winding W), the flux component φp2 of the permanent magnet unit PME is amplified by the flux φw of the pole winding W and flows through the second stator tooth SZ2 of the stator pole SP. At the same time, the flux φw of the pole winding W at least partially compensates the flux component φp1 of the permanent magnet unit PME, which flows through the first stator tooth SZ1 of the stator pole SP. The periodic directional inversion of the magnetic flux φw generated in the pole winding W, in the rotor position represented in FIG. 1, thus results in a) periodically-alternating magnetic activation (and deactivation) of the first SZ1 and second SZ2 rotor teeth. As the pole winding W of respectively adjacent stator poles SP receives current from another phase of the three-phase AC (for example, in a three-phase AC system, with a stator S having six stator poles SP, the pole windings W of the respectively opposing stator poles SP are supplied with current from the same current phase, but are wound in opposite directions), alternation of the magnetic activation (and deactivation) of the first SZ1 and second SZ2 stator teeth does not proceed simultaneously on all the stator poles SP, but is temporally offset (phase-displaced) according to their spatial distribution over the circumference of the stator S, in the rotational direction of the rotary magnetic field φw.

Typically, the rotor L of a flux switching machine FSM is of radially-symmetrical (rotationally symmetrical) design. As a result, magnetic (and, evidently, also electrical) states of a flux switching machine FSM with the rotor positions mechanically displaced through 360°/Z are not mutually distinguishable (and are thus identical), where Z is the number of teeth LZ on the rotor L. Thus, for a rough description of the operating sequence of a flux switching machine FSM (with a rotor L of rotationally symmetrical design), it will initially be sufficient to consider the operating sequence thereof for the movement of the rotor L through a circumferential angular range of 360°/Z only.

For the constitution of the useful torque M, the respective active magnetic circuit MK (which twice crosses the air gap LS) must be closed. Consequently, the constitution of the useful torque never involves a single rotor tooth LZ, but always at least two adjoining rotor teeth LZ (a rotor tooth pair).

It can be inferred that, in the stationary operation of an FSM, where Q/Z is not equal to 1, it is either always the previous opposing rotor tooth pair (with respect to the active rotor tooth pair) or always the subsequent opposing rotor tooth pair (with respect to the active rotor tooth pair) which next contributes to the constitution of the torque M. The letter Q designates a slot number Q=2ps of the stator S (stator slot number), where p is a pole pair number of the stator S and s is a phase number of the stator S. In the example shown in FIG. 1, the phase number s=3, the pole pair number p=1 and the slot number Q=6. The position of the rotor tooth pairs which next contribute to the constitution of the torque M, in relation to the active rotor tooth pair, for the previous opposing rotor tooth pair can be expressed as 180°+360°/2Z, and for the subsequent opposing rotor tooth pair as 180°−360°/2Z.

For stationary operation, it can be inferred that the rotor tooth pair which currently primarily contributes to the constitution of the torque M, at a specific time point in the electrical cycle, relative to the adjoining stator pole pair with which it interacts magnetically, lies in a specific relative circumferencial angle position, regardless of the rotor tooth pair and the stator pole pair considered. The relative circumferencial angle position is dependent upon the load point, and upon whether the flux switching machine FSM is operating in a motor or generator mode.

Over a circumferential direction of the stator S of a flux switching machine FSM, the following stator components typically alternate in the following sequence: first stator tooth SZ1 of a first stator pole SP', permanent magnet unit PME' of the first stator pole SP', second stator tooth SZ2 of the first stator pole SP', winding space WR for the first stator pole SP' and a second stator pole SP", first stator tooth SZ1" of the second stator pole SP2", permanent magnet unit PME" of the second stator pole SP", second stator tooth SZ2" of the second stator pole SP", winding space WR for the second stator pole SP" and a third stator pole SP'", etc. Adjoining stator teeth SZ1, SZ2 are thus alternately spaced by permanent magnet units PME and winding spaces WR.

The fundamental operating sequence of the electric machine FSM will now be described with reference to FIG. 2. If a rotor tooth LZ is positioned on a first stator tooth SZ1 of a stator pole SP which, from the viewpoint of said first stator tooth SZ1, is not presently energized in a magnetic flux-compensating manner, first magnetic flux lines ML1 are routed, for example, from the rotor tooth LZ through the air gap LS to the first stator tooth SZ1 (see top left-hand figure). If the same rotor tooth LZ is positioned on the second stator tooth SZ2 of the same stator pole SP, and the stator pole SP, from the viewpoint of the second stator tooth SZ2, is not energized in a magnetic flux-compensating manner, second magnetic flux lines ML2 are routed from the second stator tooth SZ2 through the air gap LS to the rotor tooth LZ (see bottom left-hand figure). The direction of the magnetic flux component $\phi p$ in the rotor tooth LZ, which is generated by the permanent magnet units PME, is thus progressive, i.e. is inverted upon each incremental movement of the rotor tooth LZ to the next stator tooth SZ1, SZ2 (of the same or an adjoining stator pole SP). By the magnetic field-synchronous rotation of the rotor L around its rotor axis LA, a periodic magnetic flux $\phi p$ occurs in the rotor tooth LZ (i.e. a magnetic flux having a magnetic flux period and two zero-crossings per magnetic flux period), which is generated by the permanent magnet units PME arranged in the stator of the flux switching machine FSM.

In this connection, it is indicated that the air gap LS in each of the forms of embodiment described can be filled with one or more (non-ferromagnetic) materials other than air, for example aluminum or a non-magnetic special steel, or another gas such as, for example, nitrogen, carbon dioxide, helium or one of the other noble gases. It is nevertheless customary to describe such an air gap, which contains not only air, or even no air at all, as an air gap.

The incremental movement of the rotor tooth LZ from a first stator tooth SZ1 of a stator pole SP to a second stator tooth SZ2 of the same stator pole SP (or in the inverse direction) is executed via a first neutral position $\beta pme$ of the rotor tooth LZ, in which the rotor tooth LZ lies in the direction of a mid-plane ME of the permanent magnet unit PME (see top right-hand figure). Approximately in this first neutral position $\beta pme$, the magnetic flux $\phi p$ generated by the permanent magnet units PME in the rotor tooth LZ undergoes a first of the two zero-crossings of the magnetic flux period in the rotor tooth LZ.

The incremental movement of the rotor tooth LZ from the second stator tooth SZ2 of a first stator pole SP to a first stator tooth SZ1 of an adjoining second stator pole SP (or in the inverse direction) is executed via a second neutral position $\beta w$ of the rotor tooth LZ, in which the rotor tooth LZ lies in the direction of a winding space WR between the first SP and the second stator pole SP (see bottom right-hand figure). Approximately in this second neutral position $\beta w$, the magnetic flux $\phi p$ generated by the permanent magnet units PME in the rotor tooth LZ undergoes the second of the two zero-crossings of the magnetic flux period in the rotor tooth LZ.

In general, a magnetic interaction between the rotor tooth LZ and the stator S is not desirable in either of the two neutral positions $\beta pme$, $\beta w$, on the grounds that, in both of these two neutral positions $\beta pme$, $\beta w$ of the rotor tooth LZ, at least one of the other rotor teeth LZ of the rotor L ("already") assumes the function of magnetic interaction with the stator S, in order to generate a tangential motive force KT between the rotor L and the stator S (thereby resulting, in a rotary machine FSM, in a torque M around the rotor axis LA). Moreover, such a magnetic interaction between the rotor tooth LZ and the stator S (which is not required in either of the two neutral positions $\beta pme$, $\beta w$) can also be undesirable, on the grounds that it generates energy losses associated with unnecessary magnetization reversal processes in the rotor tooth LZ.

In order to reduce a magnetic interaction between the rotor tooth LZ and the stator S in the first neutral position $\beta pme$, the present invention proposes that the permanent magnet unit PME incorporates a recess AN, which faces the rotor L. By means of the recess AN, within a neutral position range $\Delta\beta$ of the first neutral position $\beta pme$, the air gap LS between the rotor L and the stator S is at least partially enlarged, thereby increasing a magnetic resistance between the rotor tooth LZ and the stator S, and consequently reducing a magnetic interaction between the rotor tooth LZ and the stator S within this neutral position range $\Delta\beta$.

In the stator pole SP represented in FIG. 1, the permanent magnet unit PME constitutes a first magnetic potential source, with a magnetomotive force $\Theta p$. The pole winding W of the stator pole SP, if an electric current flows therein, constitutes a second magnetic potential source, with a magnetomotive force $\Theta w$.

Figure 2:
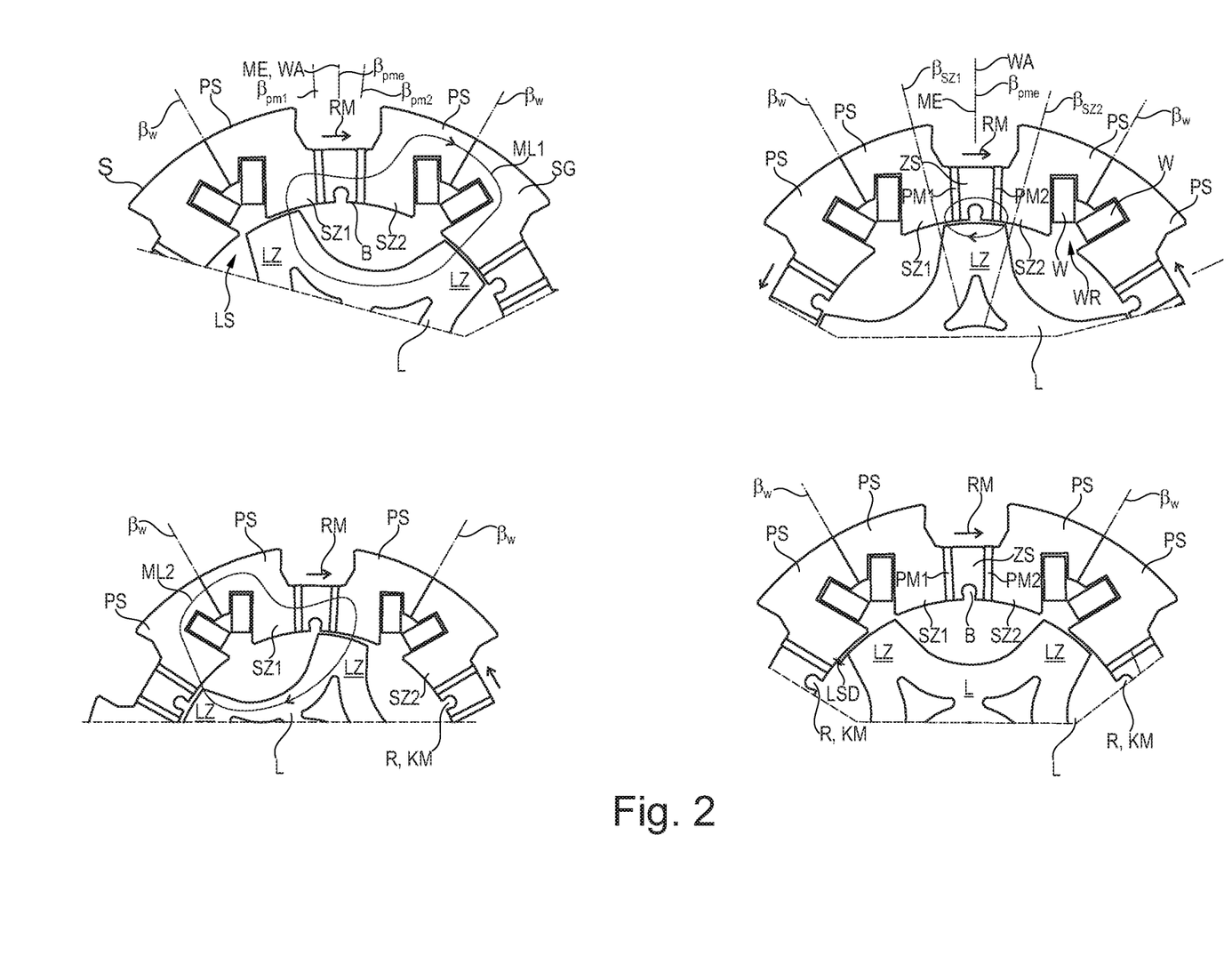
FIG. 2 shows four schematic detailed views of the section represented in FIG. 1, for four different rotor tooth positions.

If the rotor tooth LZ is situated in the circumferential angle position $\beta sz1$ (see FIG. 2, top right-hand side) of a first stator tooth SZ1, the magnetic flux $\phi w$ of the pole winding W, upon the (assumed) positive energization of the pole winding W, is routed on the same path as magnetic flux $\phi p$ of the permanent magnet unit PME (see FIG. 2, top left-hand side). In this circumferential angle position $\beta sz1$ of the rotor tooth LZ, the magnetic circuits of the permanent magnet unit PME and the pole winding W are thus essentially identical (wherein the case considered here is idealized, and actual conditions are generally dependent upon the load point, and upon whether the flux switching machine is operating in a motor or generator mode). The same then also applies to the magnetic resistance Rm of the (substantially identical) magnetic circuits, with respect to the magnetic field generated by the permanent magnet unit PME and by the pole winding. In this circumferential angle position $\beta sz$ of the rotor tooth LZ, the magnetic circuit is completed by the rotor L, such that the magnetomotive force φp of the permanent magnets PM1, PM2 and the magnetomotive force Θw are superimposed by electric current in the winding W in the same direction. If the magnetic circuit MK is completed in this manner, the following applies: Θg=Θp+Θw.

If the rotor tooth LZ is situated in the circumferential angle position βsz2 (see FIG. 2, top right-hand side) of a second stator tooth SZ2, the rotor L completes another magnetic circuit MK (see FIG. 2, bottom left-hand side). Again, in this circumferential angle position βsz2 of the rotor tooth LZ, the magnetic circuits of the permanent magnet unit PME and the pole winding W are essentially identical. However, the magnetic flux φw of the pole winding W, again by the assumption of the positive energization of the pole winding W, is routed on the same, but inverse (opposing) path as the magnetic flux φp of the permanent magnet unit PME. Moreover, in this circumferential angle position βsz2 of the rotor tooth LZ, the two magnetic potential sources, in practice, are inversely connected in series (by the subtraction of the magnetomotive force φw generated by electric current from the magnetomotive force φp generated by the permanent magnets PM1, PM2), such that, in relation to the direction of the magnetomotive force of the permanent magnets PM1, PM2, the overall magnetic potential Θg in the common magnetic circuit MK is calculated by Θg=φp−Θw, in the inverse case.

The magnetic field φw of the pole windings W thus changes its strength (magnitude) and polarity (direction) electrically. Conversely, the magnetic field φp of the permanent magnets PM1, PM2 is alternated (commutated) by the mechanical movement of the rotor between different magnetic circuits MK. By the mechanical movement of the rotor, both the (actual) polarity of the magnetic field φp (of the permanent magnet unit PME) in the rotor L and the (actual) polarity of the interlinked magnetic field φp (of the permanent magnet unit PME) are commutated with the associated pole winding W.

In all the circumferential angle positions (and thus, specifically, in the two circumferential angle positions βsz1 and βsz2 of the first rotor tooth LZ), the overall magnetic flux φg is calculated as follows by Hopkinson's law: φg=Θg/Rm.

If the rotor tooth LZ is situated in the circumferential angle position βpm1 (see FIG. 2, top left-hand side) of a single first permanent magnet PM1, the magnetic flux φp of the permanent magnet unit W is routed via a magnetic circuit MK, which is only routed directly through this single rotor tooth LZ (i.e. with no diversion via the pole winding W and another rotor tooth LZ). Consequently, in this circumferential angle position βpm1, the force KT (or the torque M) between the rotor L and the stator S cannot be electrically influenced by the magnetomotive force Θw which is generated by the electric current in the pole winding W.

If the rotor tooth LZ is situated in the circumferential angle position βpm2 (see FIG. 2, top left-hand side) of a single second permanent magnet PM2, the magnetic flux φp of the permanent magnet unit W is routed via a magnetic circuit MK, which is only routed directly through this single rotor tooth LZ (i.e. with no diversion via the pole winding W and another rotor tooth LZ). Consequently, again in this circumferential angle position βpm2, the force KT (or the torque M) between the rotor L and the stator S cannot be electrically influenced by the magnetomotive force Θw which is generated by the electric current in the pole winding W.

However, such magnetic short-circuits are undesirable, amongst other reasons, on the grounds that they are associated with an imperfect and periodic magnetization reversal of the rotor material. The associated braking torque can be advantageous, if the flux switching machine FSM is required to show an inherent rotary resistance. However, this will be undesirable, if the flux switching machine FSM is primarily intended to achieve the most efficient possible conversion of electrical energy into mechanical energy (or vice versa).

In order to prevent power losses associated with periodic magnetization reversal, and to reduce the resulting braking torques, the present invention proposes the incorporation of a recess AN in the region of the permanent magnet unit PME. A thickness LSD of the air gap LS (air gap thickness) is thus expanded, at least in part of a neutral position range, which encompasses the first neutral position βpme, or is at least in the vicinity of the latter.

Figure 3:
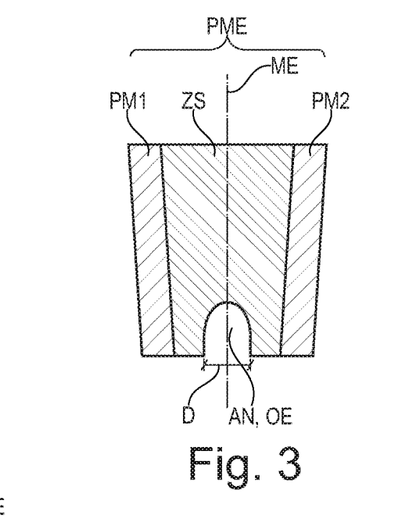
FIG. 3 shows a schematic representation of a first embodiment of a permanent magnet unit with a recess, having a parabolic planar cross-section in a transverse plane of the stator, wherein a diameter of the cross-section expands in the direction of the rotor.

The first embodiment of a permanent magnet unit PME with a recess AN, represented in FIG. 3, is configured with a parabolic planar cross-section in a transverse plane TE of the stator S. A diameter D of the cross-section expands in the direction of the rotor L. Consequently, the geometry of the recess AN can be optimized for a desired speed and/or field attenuation behavior.

Figure 4:
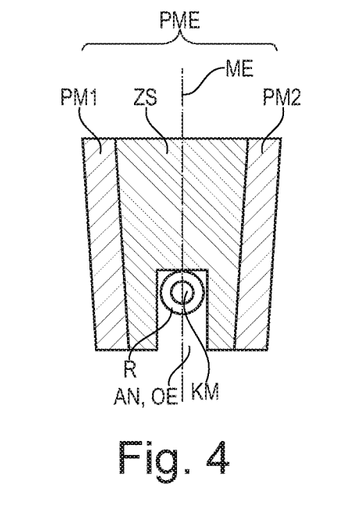
FIG. 4 shows a schematic representation of a second embodiment of a permanent magnet unit with a recess, having a rectangular cross-section in a transverse plane of the stator.

The second embodiment of a permanent magnet unit PME with a recess AN, represented in FIG. 4, is configured with a rectangular cross-section in a transverse plane TE of the stator S.

Figure 5:
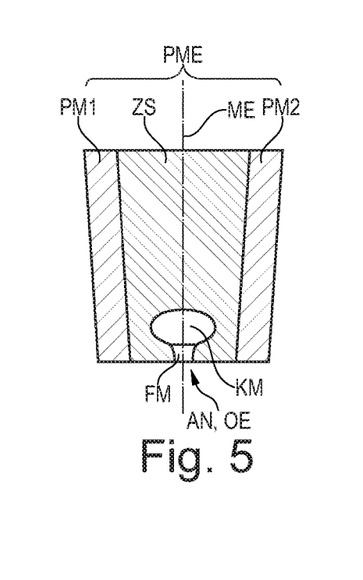
FIG. 5 shows a schematic representation of a third embodiment of a permanent magnet unit with a recess, having a mushroom-shaped cross-section in a transverse plane of the stator, wherein a diameter of the cross-section tapers in the direction of the rotor.

The third embodiment of a permanent magnet unit PME with a recess AN, represented in FIG. 5, is configured with a mushroom-shaped cross-section in a transverse plane TE of the stator S. A diameter D of the cross-section tapers, in a mushroom shape, in the direction of the rotor L.

Figure 6:
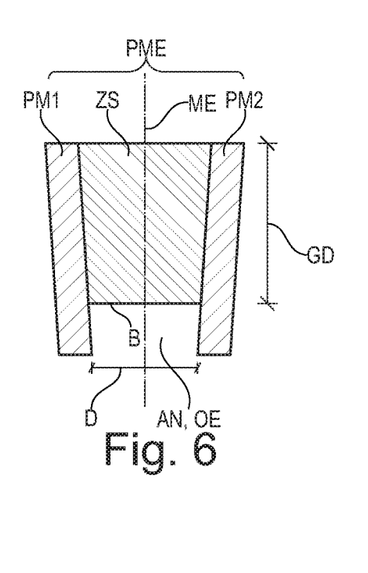
FIG. 6 shows a schematic representation of a fourth embodiment of a permanent magnet unit with a recess, which extends over an entire lateral surface of the intermediate element which faces the rotor.

FIG. 6 shows a fourth embodiment of a permanent magnet unit PME with a recess AN which extends over an entire lateral surface B of the soft magnetic intermediate segment ZS, which faces the rotor L.

Figure 7:
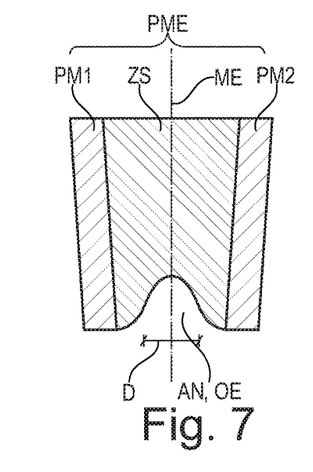
FIG. 7 shows a schematic representation of a fifth embodiment of a permanent magnet unit with a recess, which extends over an entire lateral surface of the intermediate element which faces the rotor.

FIG. 7 shows a fifth form of embodiment of a permanent magnet unit PME with a recess AN having a cross-section, the boundary of which with the ferromagnetic region of the intermediate segment ZS shows a cosinusoidal characteristic. A maximum value on the cosine curve is located in the region of the mid-plane ME of the permanent magnet unit PME, and the left-hand and right-hand minimum values on the cosine curve are located, for example, at the transition to the first PM1 and second permanent magnets PM2 of the permanent magnet unit PME.

The magnetic circuit MK of an FSM can be configured such that, in each stator pole SP, two permanent magnets PM1, PM2 are present, which are radially oriented and tangentially magnetized. Typically, the direction of magnetization RM of the permanent magnets PM1, PM2 alternates from stator pole SP to stator pole SP'.

The present invention proposes, on the side B of the soft magnetic intermediate segment ZS which faces the machine axis A (i.e. the rotor L), the incorporation of a recess AN, by means of which the magnetic resistance Rm in the region of a first neutral position βpme of the rotor L is increased, in comparison with a flux switching machine FSM of otherwise equivalent construction (the permanent magnet unit PME of which incorporates no recess AN). The braking torque generated in the region of the first neutral position βpme of the rotor L is thus reduced. The soft magnetic intermediate segment ZS is typically arranged in each case between the two permanent magnets PM1, PM2 of a stator tooth SZ.

The configuration of the magnetic circuit MK of the flux switching machine FSM according to the invention can also be applied to other combinations of stator poles/rotor teeth and/or to flux switching machines FSM having an external rotor, which will be known or familiar to a person skilled in the art. The configuration of the flux switching machine FSM according to the invention can also be applied in the event of variations in the design of the flux switching machine FSM in the axial direction (for example, segmentation of the permanent magnets PM1, PM2, variations in the skew of the rotor L), specifically those which are likewise known to a person skilled in the art.

The rotor L of the flux switching machine FSM according to the invention can be configured in accordance with the known prior art. For example, it can assume a basic cylindrical or conical shape having an annular cross-section (in a transverse plane of the rotor L). On the outer edge of the rotor L, for example, Z rotor slots LN can be arranged, which are mutually separated by a rotor tooth LZ (rotor pole). This topology gives a resulting number of Z rotor teeth LZ, wherein the mutual circumferential angle positions of directly adjoining rotor teeth LZ differ by an angle of 360°/Z in each case.

Independently hereof, the stator S of a flux switching machine FSM (in a transverse plane of the stator S) typically assumes an annular cross-section, on the inner edge SI of which Q slots are arranged (each with a winding space WR), which are mutually separated in each case by a stator pole SP. Thus, for a number Q of stator poles SP, this gives a circumferential angle position difference of 360°/Q between directly adjoining stator poles SP, which are arranged with a mutual circumferential angular offset on the inner edge SI of the stator S.

In each stator pole SP, two permanent magnets PM1, PM2 are typically arranged, which are mutually spaced in the circumferential direction of the stator S.

Openings in the stator poles SP, which accommodate the permanent magnets PM1, PM2, can be arranged and designed such that each individual stator pole S has two pole segments PS. Consequently, the pole segments PS assume two shapes, which are alternately arranged on the circumference and are mutually separated by a permanent magnet unit in each case. The winding spaces WR are stator slots, which are located between two stator poles SP respectively, and which accommodate the pole winding W. The stator winding is typically designed as a concentrated winding, and is configured such that coil encompasses the two stator teeth SZ1, SZ2 of a stator pole SP respectively, and the winding axis WA is oriented in a radial direction.

If the stator S (with respect to a central transverse plane TE of the stator S) is configured with mirror-image symmetry in the axial direction, all the pole segments PS can be of identical construction.

FIG. 1 shows a flux switching machine FSM with a 6/5 topology. For the stator of a flux switching machine FSM of this type, twelve pole segments PS and twelve permanent magnets PM1, PM2 are required.

By the configuration of the magnetic circuit of a flux switching machine FSM according to the invention, the properties thereof are altered in a manner which is conducive to the attenuation of the magnetic flux φp of the permanent magnets PM1, PM2 by the injection of a corresponding electric current in the pole winding W. Thus, by the configuration of the magnetic circuit of the flux switching machine according to the invention, attenuation of the magnetic flux φp of the permanent magnets PM1, PM2 by the injection of a corresponding electric current in the pole winding W is improved. The flux switching machine FSM according to the invention, on the grounds of the specific configuration of the magnetic circuit MK, thus shows superior field attenuation properties, in comparison with flux switching machines from the prior art. This permits the use of the flux switching machine FSM in a higher speed range than flux switching machines from the prior art.

In a simulation of a flux switching machine FSM with and without a recess AN, at a speed of 20 000 revolutions per minute, a current angle of 186°, a current amplitude of 253 A and an approximately equal torque of 3.78 or 3.75 Nm, a recess AN was associated with an approximate 8% reduction in the induced voltage (59.5 V rather than 64.8 V) and an approximate 23% reduction in the UMF (unbalanced magnetic force on rotor), in comparison with the absence of a recess AN. The reduction in the induced voltage is associated with an advantageous reserve potential for a further increase in speed. By the significant reduction of UMF, the generation of noise and vibrations by the flux switching machine FSM is advantageously reduced.

The invention claimed is:

1. A stator for an electric machine comprising a rotor, wherein the stator comprises stator poles, wherein at least one partial amount of the stator poles each comprises a pole winding and a permanent magnet unit, wherein a first magnetic flux induced by the permanent magnet unit is superimposed by a second magnetic flux if an electric voltage is applied to the pole winding or an electric current is injected into the pole winding,
   a recess is arranged in the permanent magnet unit, which recess faces the rotor;
   wherein the permanent magnet unit comprises a first permanent magnet and a second permanent magnet which is arranged in series with the first permanent magnet, with the same magnetic pole orientation, wherein the first and second permanent magnets in the series-connected arrangement are magnetically interconnected by means of a soft magnetic intermediate segment, and wherein the recess is arranged in the soft magnetic intermediate segment and the recess is located entirely circumferentially between the first and second permanent magnets.

2. The stator as claimed in claim 1, wherein the recess is at least partially radially aligned with at least one of the first and second permanent magnets.

3. The stator as claimed in claim 1, wherein the recess is configured in a transverse plane of the stator with a rectangular or trapezoidal cross-section.

4. The stator as claimed in claim 1, wherein an opening in the recess tapers and/or expands in the direction of the rotor.

5. The stator as claimed in claim 1, wherein the recess is a slot, the principal longitudinal axis of which is oriented transversely to a transverse plane of the stator.

6. The stator as claimed in claim 1, wherein the recess is designed for the conveyance of a coolant and/or the recess is designed for the accommodation of a tube which is provided for the conveyance of a coolant, and/or the recess contains a filler material which is not ferromagnetic.

7. The stator as claimed in claim 1, wherein at least one of the stator poles comprises two pole segments which are mechanically connected, and/or at least one of the stator poles comprises two pole segments which are mechanically connected.

8. An electric machine comprising a stator and a rotor, which is designed, at least within a first rotor position range, to complete a first magnetic circuit, wherein a permanent magnet unit of the stator pole magnetizes a pole winding of the stator pole in a first direction, wherein the rotor is moreover designed, at least within a second rotor position range, to complete a second magnetic circuit, wherein the permanent magnet unit magnetizes the pole winding of the stator pole in a second direction, which is in opposition to the first direction, characterized in that the stator is a stator as claimed in claim 1.

9. A vehicle, wherein the vehicle comprises an electric machine as claimed in claim 8.

10. The stator as claimed in claim 1, wherein the first permanent magnet and the second permanent magnet each extend across an entire radial length of the stator.

11. The stator as claimed in claim 2, wherein the recess extends over a full lateral surface of the soft magnetic intermediate segment, facing the rotor, and wherein the recess extends circumferentially over an entire distance between said first and second permanent magnets.

12. The stator as claimed in claim 1, wherein the first and second permanent magnets extend radially to a radially inner surface of the stator.

13. An electric machine, comprising:

a stator disposed extending about an axis and including a plurality of stator poles;

each of the stator poles including at least one pole winding and at least one permanent magnet unit, wherein a first magnetic flux induced by the at least one permanent magnet unit is superimposed by a second magnetic flux if an electric voltage is applied to the at least one pole winding or if an electric current is injected into the pole winding;

the at least one permanent magnet unit including a first permanent magnet and a second permanent magnet arranged is series with one another and with the same magnetic pole orientation as one another;

the at least one permanent magnet unit further including a soft magnetic intermediate segment located between the first and second permanent magnets; and a radial inner surface of the soft magnetic intermediate segment defining a recess, wherein the recess is located entirely circumferentially between the first and second permanent magnets.

14. The electric machine as claimed in claim 13, wherein the first permanent magnet and the second permanent magnet each extend across an entire radial length of the stator.

15. The electric machine as claimed in claim 13, wherein the recess is at least partially radially aligned with at least one of the first and second permanent magnets.

16. The electric machine as claimed in claim 15, wherein the recess extends circumferentially over an entire distance between said first and second permanent magnets.

17. The electric machine as claimed in claim 13, wherein the first and second permanent magnets extend radially to a radially inner surface of the stator.

\* \* \* \* \*